June 30, 1936.  A. S. TUTTLE  2,045,889
CARRIER MECHANISM
Filed July 7, 1932  2 Sheets-Sheet 1
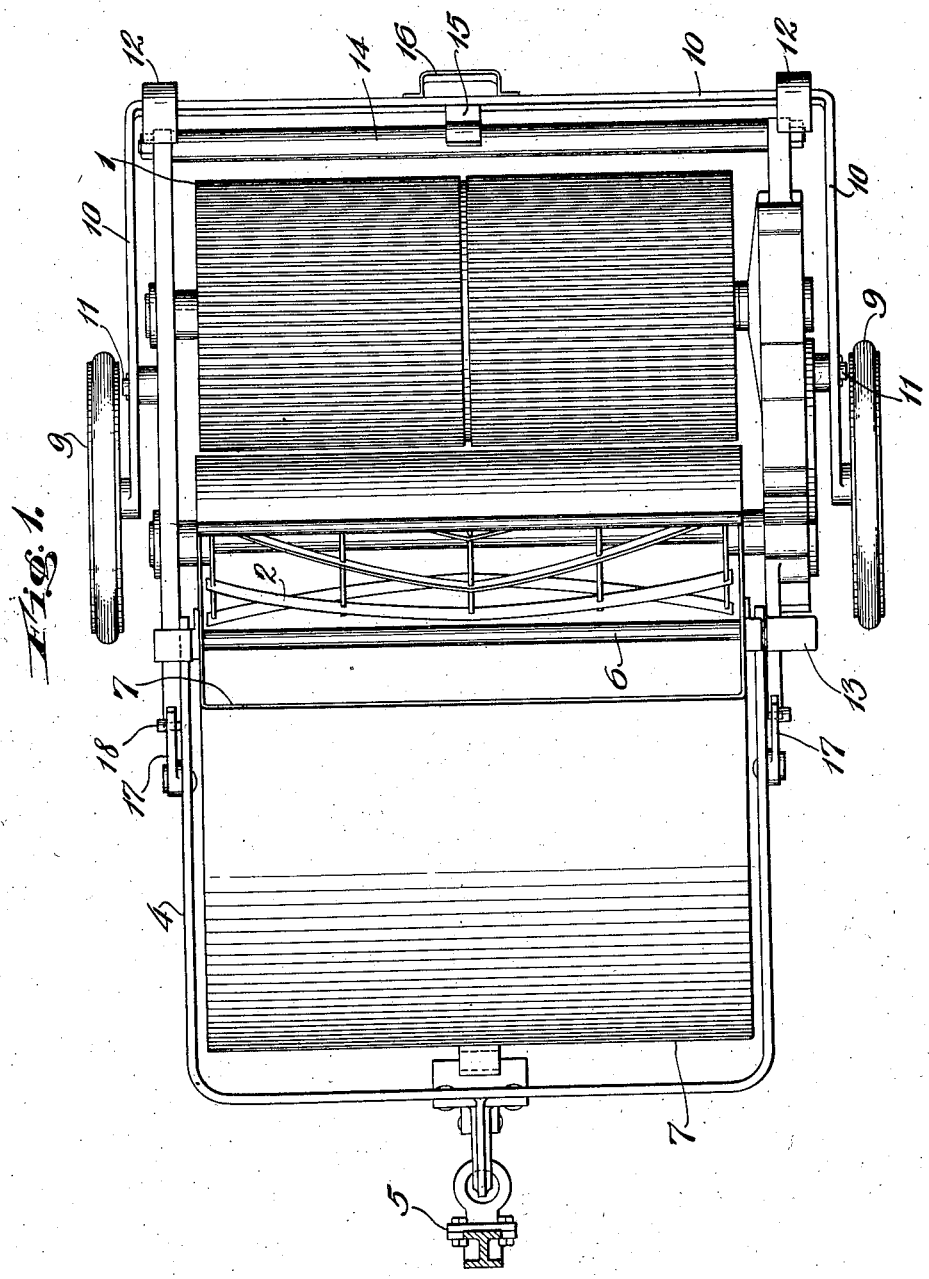
Arthur S Tuttle INVENTOR.
BY
ATTORNEYS.

June 30, 1936.  A. S. TUTTLE  2,045,889
CARRIER MECHANISM
Filed July 7, 1932   2 Sheets-Sheet 2
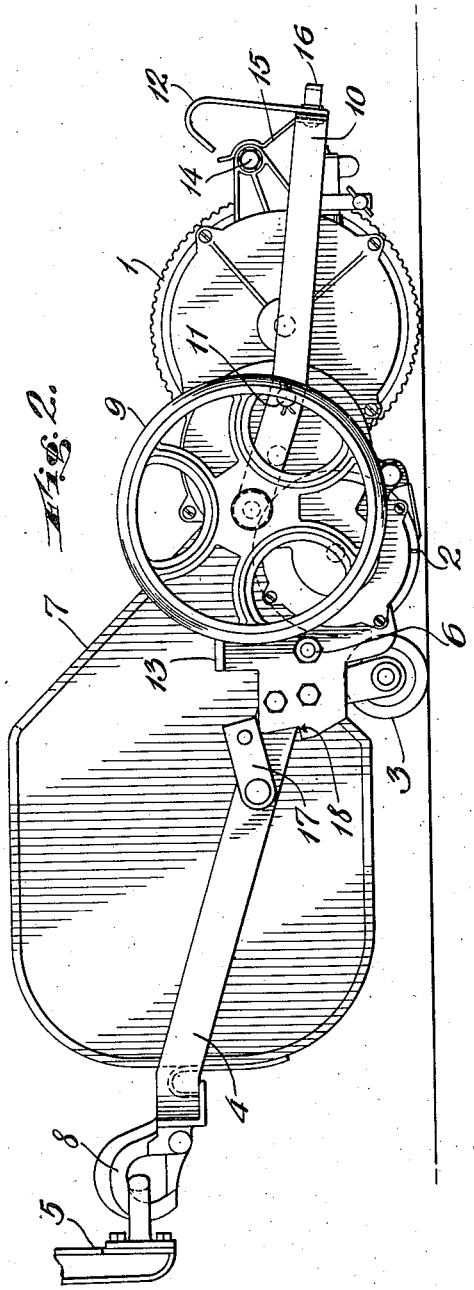
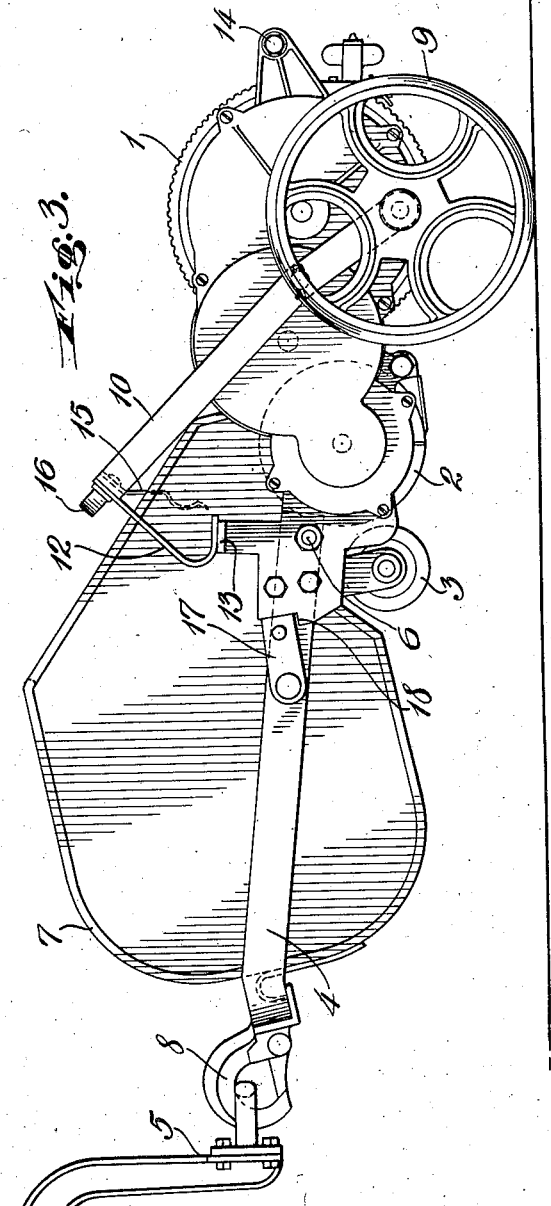

Patented June 30, 1936

2,045,889

UNITED STATES PATENT OFFICE 2,045,889

CARRIER MECHANISM

Arthur S. Tuttle, Salem, Mass., assignor to Worthington Mower Company, Stroudsburg, Pa., a corporation of Delaware Application July 7, 1932, Serial No. 621,150

5 Claims. (Cl. 56—7)

The invention relates to tractor-drawn lawn mowers and like apparatus and its purpose is to simplify the process of moving such apparatus about when not operating, as for example in the case of a power-operated putting green mower, to enable it to be moved from one green to the next while supported on special wheels provided for the purpose rather than on its own ground wheels or roller. The invention is particularly applicable to the putting-green gang-mower disclosed in Patent No. 1,825,109 in which a gang of units is hauled by a single tractor in overlapping positions, but it is not limited to such use.

In the accompanying drawings, Fig. 1 is a plan view of one unit with the invention applied.

Fig. 2 a side elevation of the same in its normal or working position, and

Fig. 3 the same in its carried position.

The unit shown, as will be observed, is of the type operated by virtue of its contact with and travel over the ground or lawn, having a rear roller or rollers 1, a fly knife 2 driven thereby and a front roller 3 which is adjustable as usual in order to regulate the height of the cut, but the particular design or function of the unit to which the invention may be applied is not of consequence. It is connected by a draft element 4 to a tractor member 5 by which it is propelled or drawn, such draft element 4 being preferably in the form of a bail pivoted to the front end of the unit upon or adjacent the ends of the front cross-rod 6 of the latter, so that it may surround the grass catcher box 7 which is removably set inside of the bail directly in front of the fly knife as indicated. The draft element 4 is removably hooked at 8 to the tractor member 5. The latter may be draft bracket or draw bar or other connector of any suitable self-propelled tractor not shown, and this member travels at a substantially constant level above the ground, supporting the front end of the bail 4 at that level. There are thus two pivotal joints, permitting movement about horizontal axes, in the connecting means between the unit and its tractor, the forward joint being at hook 8 and the rear joint at the cross rod 6. The joint connection permits the unit to rock or tilt in accommodation to all manner of undulations of the ground on which it works free of any restraint by the tractor member.

According to this invention the unit and its draft means are provided with a wheeled carrier device which is held out of contact with the ground in its normal condition, that is, when the unit is working. Such device may be variously constructed, with one or more carrier wheels as desired, and preferably has two wheels 9—one on each side of the unit and both journalled on a movable supporting member or lever 10 by which they may be depressed into contact with the ground when desired and so as to assume on themselves the weight or support of the unit, the latter being thereby lifted off the ground. The supporting member for these carrier wheels is preferably of yoke form, as shown, so that it can be fulcrumed at 11 at each side of the frame of the unit, with the carrier wheels thus located also at the sides of the unit and with the fulcrum axis so located that swinging the yoke from a rearward to a forward position throws the carrier wheels 9 down and through the dead center line to their depressed or working position, indicated in Fig. 3. In this position, as will be seen, the rear roller of the unit, which is its drive roller and is in this respect the equivalent of the ground wheels of other types of mower units, is raised off the ground and its weight transferred to the carrier wheels. While other locations of the centers would also suffice to transfer the load of the unit onto a carrier wheel or wheels, the arrangement shown is preferred since by shifting the carrier wheels through their dead center position the weight of the unit itself serves to help the action and retain the yoke in its thrown-over or unit-carrying position.

Bumpers 12 which are formed of bent metal straps, as indicated, and are therefore slightly resilient, are secured to the yoke to limit its forward throw by striking and resting on the ledges 13 on the front part of the unit frame, Fig. 3. In the other position of the yoke 10, it is releasably locked to the rear cross-rod 14 of the unit by means of a spring detent 15 which snaps over the cross rod thus holding the carrier wheels in their raised or idle positions. A hand grip 16 is shown on the yoke, but is not necessary.

The operation of the carrier will be apparent from the description but it is not always sufficient merely to lift the rear roller of the unit off the ground. If the joint between the unit and its draft bail 4 has a considerable amplitude of pivotal motion and the carrier raises the unit into an unbalanced position (throwing its center of gravity forwardly of its axis of support by the carrier in the present case) the front roller of the unit may still be resting on the ground when the rear roller is lifted, unless means are provided to support it also. The invention includes such means which are represented in the present case by the latches 17 pivoted on the draft bail 4 in position to engage respectively, the notches 18 in the front of the unit frame. By lifting this front end of the unit the latches may be caused to enter or drop into the notches, so as to lock the joint as indicated in Fig. 3, in which case the front roller will be elevated and the unit will then be carried wholly above the ground on the carrier wheels and tractor member. Other means can obviously be provided for locking the joint or limiting its movement when necessary. The latches can of course be engaged with their notches either before or after throwing the yoke and the lifting of the front end of the unit to receive the latches can be done by hand or by simply pressing with the foot on the rear cross rod 14, or on the carrier yoke if that has not been thrown forward, which swings the front of the unit upwards.

In this form of the invention the locking of the joint between the draft bail and the unit, in effect, converts the latter into a sulky-type vehicle, thereby permitting the unit as a whole to be more readily supported entirely off the ground, its dead weight sustained largely by the carrier wheels and the unbalanced weight by the tractor member.

I claim:

1. In tractor-drawn lawn mowing apparatus in which a hauled mower unit is provided with ground wheels whose contact with and travel upon the ground operates the cutting mechanism of the unit, means for elevating the ground wheels out of contact and driving relation with the ground comprising a carrier device connected with the unit and including a member with wheels journalled thereon, said member being pivoted to swing through its dead center position and having one extreme position in which it holds said wheels off the ground and another in which it locates said wheels in carrying relation to the unit.

2. In tractor-drawn lawn mowing apparatus in which a hauled mower unit is provided with ground wheels, means for elevating the ground wheels wholly out of contact with the ground comprising a carrier yoke pivotally mounted on said unit, carrier wheels journalled on said yoke at the sides of said unit and shiftable downwardly and through the dead center line of its pivotal axis to a unit-carrying position.

3. Tractor-drawn lawn mowing apparatus in which a hauled mower unit is provided with ground wheels, the unit being connected to a tractor member by draft connections comprising front and rear joints, characterized by the fact that there is provided means for locking one of said joints when one end of the unit is raised off the ground and also a carrier wheel, normally idle but movably mounted on the unit and adapted to be moved into contact with the ground to support the other end of the unit out of contact therewith.

4. In lawn mowing apparatus including a tractor member, a lawn mower unit having front and rear ground rollers and cutting mechanism supported thereby at predetermined cutting height above the ground, a draft member having a front connection with said tractor member and a rear, pivotal connection with the unit, about which latter connection the unit is free to rock in accordance with ground undulations in the line of travel, the combination with said unit and connections of a wheel carrier device carried by the unit normally in an idle position, and means on the unit for depressing said device to transfer the support of the unit from its said rollers to said device and said front connection.

5. Tractor-drawn lawn mowing apparatus in which a hauled mower unit is provided with ground wheels, the unit being connected to a tractor member by draft connections comprising front and rear joints, characterized by the fact that there is provided locking means for limiting movement at said rear joint when the end of the unit adjacent said joint is raised off the ground and also a pair of carrier wheels, normally idle but movably mounted on the unit and adapted to be moved into contact with the ground to support the unit wholly out of contact therewith.

ARTHUR S. TUTTLE.